United States Patent
Dekker et al.

(10) Patent No.: US 7,467,284 B2
(45) Date of Patent: Dec. 16, 2008

(54) METHOD AND SYSTEM OF EXTERNALISING/INTERNALISING DATA RECORD THAT ALLOW PROCESSING OF PART OR ALL OF THE RECORD

(75) Inventors: Gerard Johan Dekker, Nieuw-Vennep (NL); Albert Jan Bosscha, Nieuw-Vennep (NL); Antonius Johannes Petrus Maria Van De Ven, Schiedam (NL)

(73) Assignee: Irdeto Access B.V., Hoofddorp (NL)

( * ) Notice: Subject to any disclaimer, the term of this patent is extended or adjusted under 35 U.S.C. 154(b) by 666 days.

(21) Appl. No.: 11/055,881

(22) Filed: Feb. 11, 2005

(65) Prior Publication Data

US 2005/0237821 A1    Oct. 27, 2005

(30) Foreign Application Priority Data

Feb. 12, 2004    (EP) .................................. 04100546

(51) Int. Cl.
*G06F 12/00* (2006.01)
(52) U.S. Cl. .................... 711/206; 711/208; 711/209
(58) Field of Classification Search .................. 711/206, 711/208, 209
See application file for complete search history.

(56) References Cited

U.S. PATENT DOCUMENTS 5,757,919 A * 5/1998 Herbert et al. ............... 713/187

OTHER PUBLICATIONS

IBM Technical Disclosure Bulletin, Sep. 1991, vol. 34, pp. 451-457, TDB-ACC-NO: NB9109451.*

* cited by examiner

*Primary Examiner*—Hyung S Sough
*Assistant Examiner*—Mardochee Chery
(74) *Attorney, Agent, or Firm*—Charles A. Lemaire; Lemaire Patent Law Firm, P.L.L.C.

(57) ABSTRACT

A method of external data storage in a system including a primary processing device, having a processor and a primary data storage unit, adapted to run application programs for processing active records in the processor and configured to store data belonging to active records in the primary data storage unit; and a secondary data storage system, accessible to the primary processing device, includes loading data belonging to an active record into the primary data storage unit and externalizing the record by transferring at least a piece of data belonging to the record to the secondary data storage system for storage. The step of externalizing a record includes the making of a call by an application program using data belonging to the record to an interface, arranged to transfer the piece of data to the secondary data storage system.

50 Claims, 6 Drawing Sheets

METHOD AND SYSTEM OF EXTERNALISING/INTERNALISING DATA RECORD THAT ALLOW PROCESSING OF PART OR ALL OF THE RECORD

RELATED APPLICATIONS

The present patent application claims the priority benefit of the filing date of European Application (EPO) No. 04100546.3 filed Feb. 12, 2004, which is incorporated herein by reference.

BACKGROUND

An example embodiment of the invention relates generally to methods of externally storing data processed by a processing device. In particular, an example embodiment of the invention relates to methods of external data storage, methods of internalising data and method of enabling external data storage and internalisation of data. An example embodiment of the invention also relates to the application of such methods in a multimedia system and to a system and computer program for executing such methods.

Examples of a method of enabling external data storage and of a method of external data storage and system adapted to carry out such a method are known, e.g. from U.S. Pat. No. 5,757,919. This publication discloses a method and system for maintaining integrity and confidentiality of pages paged to an external storage unit from a physically secure environment. This physically secure environment contains a secure processor coupled by a bus to a random access memory. An integrity check engine performs a one-way hash of data paging between the secure environment and the insecure environment, particularly an external storage unit. In one embodiment, the secure processor is architected to use a 1K page. A host processor in the insecure environment treats the pages of the secure processor stored in external memory as 1K data blocks. If a page is identified as needed, a determination is made if the page is present within the secure memory. If the page is present, a page hit occurs and no further action is required. If the page is not present, a page fault occurs. When a page fault occurs, a determination is made if there is space available in the secure memory to which the needed page can be mapped. If no space is available, then a page is selected to page out. Various selection criteria may be employed such as least recently used.

The known method and system has the disadvantage that it is difficult to select the piece of data to be transferred to the secondary data storage system. Because paging in and paging out generally involve latency and the security services increase the latency in the event of a page fault, this slows down the processing of active records.

Another example of a method of external data storage, method of internalising data method of processing records in a multimedia system and system adapted to carrying out such methods is disclosed in FR-A-2 803 471. This publication discloses a memory management process in a television receiver. The television system comprises a television, local memory means implanted in the television and external memory means associated with the television, such as a memory card or disk drive. The system comprises a computer program comprising a plurality of executable modules. A first module receives and analyses each request to memorise information. If the characteristics of the memory means do not permit the storage of new information, the first module triggers a second module. The second module frees memory space whilst respecting usage criteria of the stored information. The first and second module use a series of simple procedures to optimise the storage of information. These procedures realise, for example, the removal of data from a first memory means to a second memory means.

A problem of this known system and method is that they do not allow processing of part or all of the record once it has been externalised. If this were to happen and the piece of data were to be transferred back to the television at a later stage, the complete set of data belonging to the record would not be identical to the complete set of data as last processed by the application on the television set before externalisation.

SUMMARY

An example embodiment of the invention provides a method of enabling external data storage, a method of external data storage, a method of internalising a record, a method of enabling the internalisation of a record, a primary processing device and computer program means that are more efficient in terms of the number of transfers of data to and from the secondary storage system.

This is achieved by providing a method of enabling external data storage in a system including a primary processing device, having a processor and a primary data storage unit, adapted to process active records in the processor and configured to store data belonging to active records in the primary data storage unit; and a secondary data storage system, accessible to the primary processing device, wherein data belonging to an active record is stored in the primary data storage unit and the record is externalised by transferring at least a piece of data belonging to the record to the secondary data storage system for storage, wherein the step of externalising a record includes the receiving of at least one call initiated by an application program using data belonging to the record by an application programming interface arranged to send the piece of data to the secondary data storage system.

Thus, because the pieces of data transferred belongs to a record, the method takes better account of the fact that the processor of the primary processing device will need to access data belonging to the record than an approach based on the memory addresses available to a process run by the processor. Because the externalisation is initiated by an application program actually using the data belonging to the record it is easier to predict which record, thus which pieces of data, are likely to be needed in the primary processing device in the near future.

An example embodiment of the invention has the added advantage that no page tables are necessary for relating virtual memory addresses to physical addresses.

An embodiment includes receiving at least one externalisation message including information identifying a data section including data corresponding to at least an associated part of only one piece of data and transferring at least the identified data section in response to the externalisation message.

Thus each data section transferred to the secondary storage system for storage includes data corresponding to an associated part of only one piece of data. In cases where more than one record is to be externalised, this precludes storing data sections with a sub-section corresponding to data belonging to one record and a sub-section corresponding to data belonging to a further record. In other words, data corresponding to data belonging to one record is always stored in a separate data section from data corresponding to data belonging to another record. The embodiment has the advantage of eliminating unnecessary data transfer to, and particularly from, the secondary storage system.

An embodiment includes dividing the piece of data into a plurality of parts, receiving a plurality of externalisation messages, each identifying a data section including data corresponding to an associated one of the plurality of parts and transferring at least the identified data section in response to each externalisation message.

This embodiment has the advantage of being adaptable to the size of main memory available to the primary processing device and/or characteristics of an interface to the secondary storage system, such as the width of a data pipeline.

In an embodiment, the data corresponding to an associated part is generated by at least partly encrypting the associated part of the piece of data.

Because the data sections transferred to the secondary storage system for storage are at least partly encrypted, only the primary data storage unit and processor of the primary data processing device need be ensconced in a secure environment to maintain absolute overall security of data. Because the primary processing device need have only a primary storage unit with a limited storage capacity, thanks to the possibility of externally storing data, it is cheaper and easier to provide such a secure environment.

An embodiment includes dividing the piece of data into a sequence of consecutive parts, receiving a series of externalisation messages, each including information identifying the record and information identifying a data section by means of the position of the corresponding part in the sequence, and including data corresponding to the information identifying a data section in the data section before transferring it to the secondary storage system.

This embodiment has the advantage that information describing the order in which the data sections are to be read out again is stored in the secondary storage system. Thus, in a primary processing device with very limited capacity, particularly limited volatile main memory, the parts of the piece of data to be loaded back into the primary storage unit can be serially processed, without the need to buffer the constituent parts, or the data sections to which the parts are associated.

In one example embodiment, the method includes calculating an authentication value for each part of the piece of data and including data reflecting the authentication value in the data section that includes data corresponding to that part.

Thus, it is possible to determine at a later stage if the data in the data section, particularly the data corresponding to a part of the piece of data associated with the data section has been tampered with.

According to another aspect of the invention, there is provided a method of external data storage in a system including a primary processing device, having a processor and a primary data storage unit, adapted to run application programs for processing active records in the processor and configured to store data belonging to active records in the primary data storage unit; and a secondary data storage system, accessible to the primary processing device, which method includes loading data belonging to an active record into the primary data storage unit and externalising the record by transferring at least a piece of data belonging to the record to the secondary data storage system for storage, wherein the step of externalising a record includes the making of a call by an application program using data belonging to the record to an interface, arranged to transfer the piece of data to the secondary data storage system.

When the method is applied, control over the external storage of data belonging to records is transferred to the application program actually using the data. The call may be to an application programming interface adapted to carry out the method of enabling external data storage according to an example embodiment of the invention. Alternatively, the method may be carried out directly by an application program running in the primary processing device. It thus confers the advantage of enabling the application program to determine whether or not a record is externalised. Thus, the application program can prevent a piece of data belonging to a record it will be processing in the near future from being transferred to the secondary storage device. The execution of the application program is thus speeded up, since the latency associated with externalising the record and subsequently retrieving the piece of data from the secondary storage system when it is to be modified again, is avoided.

In one example embodiment, the method includes transferring a data section including data corresponding to at least an associated part of only one piece of data belonging to a record.

Thus each data section transferred to the secondary storage system for storage includes data corresponding to an associated part of only one piece of data. In cases where more than one record is to be externalised, this precludes storing data sections with a sub-section corresponding to data belonging to one record and a sub-section corresponding to data belonging to a further record. In other words, data corresponding to data belonging to one record is always stored in a separate data section from data corresponding to data belonging to another record. The embodiment has the advantage of eliminating unnecessary data transfer to and particularly from the secondary storage system.

In an embodiment, the piece of data is divided into a plurality of parts and wherein a plurality of data sections, each including data corresponding to an associated one of the plurality of parts, is transferred to the secondary data storage system for storage.

This embodiment has the advantage of enabling the externalisation to be adapted to the size of main memory available to the primary processing device and/or characteristics of the interface to the secondary storage system, such as the width of a data pipeline.

In an embodiment, the data corresponding to an associated part is generated by at least partly encrypting the associated part of the piece of data.

Because the data sections transferred to the secondary storage system for storage are at least partly encrypted, only the primary data storage unit and processor of the primary data processing device need be ensconced in a secure environment to maintain absolute overall security of data. Because the primary processing device need have only a primary storage unit with a limited storage capacity, thanks to the possibility of externally storing data, it is cheaper and easier to provide such a secure environment.

In one example embodiment, the method includes calculating an authentication value for each part of the piece of data and including data reflecting the authentication value in the data section that includes data corresponding to that part.

Thus, the integrity of the externally stored data can be verified.

A variant of this embodiment includes calculating the authentication value for at least one part of the piece of data using information derived from a further part as input.

Thus, where the piece of data is divided into parts and externally stored in separate data sections, the integrity of the entire set of data sections can be verified.

In one example embodiment, the method includes storing a reference data object in a data storage unit of the primary device for each externalised record, including a unique identifier, wherein data reflecting the unique identifier is included in each data section that includes data corresponding to a part of the piece of data belonging to the record.

Thus, retrieval of the various data sections containing data corresponding to the piece of data stored externally is facilitated.

In one example embodiment, the method of an example embodiment of the invention includes storing information reflecting a version count for the externalised record and incrementing the version count prior to externalising the record.

It is thus possible to keep track of the number of times the record has been externalised. This enables synchronisation of the data belonging to the record that is stored in the primary storage unit and the piece of data that is stored externally.

According to another aspect of an example embodiment of the invention, there is provided a method of internalising a record in a system including a primary processing device, having a processor and a primary data storage unit, adapted to process active records in the processor and configured to store data belonging to active records in the primary data storage unit; and a secondary data storage system, accessible to the primary processing device, and arranged to store a piece of data transferred by means of a method of external data storage according to an example embodiment of the invention, which method includes loading data belonging to the record into the primary data storage unit, wherein the system includes an interface for retrieving the piece of data belonging to the record from the secondary data storage system and the method further comprises the steps of an application program configured to use data belonging to the record determining that the record is to be internalised and making at least one call to the interface.

Thus, the application program configured to use the data belonging to a record determines that a piece of data belonging to a record is to be transferred to the primary processing device from the secondary storage system. The primary processing device may be the same as the primary processing device involved in transferring the piece of data to the secondary storage system, or it may be a different one. Thus, the method has the advantage of enabling data belonging to a record to be shared.

An embodiment of the invention includes receiving at least one data section including data corresponding to at least an associated part of one piece of data from the secondary storage system.

Thus, the data section includes data corresponding to an associated part of a piece of data belonging to one record. It is not necessary to separate the data belonging to one record from that belonging to another record, nor is data belonging to another record unnecessarily transferred with data belonging to a record which the application program has determined to be needed.

In one example embodiment, the method includes retrieving an identifier unique to the record from a reference object stored in a data storage unit of the primary processing device, wherein the data sections are stored in the secondary data storage system with information reflecting the unique identifier and are received in response to an internalisation message including information reflection the unique identifier.

Thus, the primary processing device remains aware of the existence of the record and has a mechanism for accessing the data belonging to it, even when that data is not stored in the primary data storage unit.

An embodiment of the invention, wherein the piece of data comprises a plurality of parts, includes receiving a number of data sections, each including data corresponding to an associated one of the plurality of parts.

Thus, this embodiment of the method can be executed in a primary processing device with limited processing capacity, e.g. limited main memory, as the part of the piece of data belonging to the record that is being internalised can be processed and loaded into the primary data storage unit sequentially. This embodiment is also adapted to take account of any limitations to the capacity of an interface to the secondary data storage system.

An embodiment includes receiving at least one data section including an authentication value, retrieving a secret piece of information stored in the primary processing device, calculating a verification authentication value for each data section from at least part of the data corresponding to at least an associated part of the piece of data, using the secret piece of information, and comparing the verification authentication value and the authentication value for each data section.

Thus, it can be determined whether the data included in the received data sections is authentic. Because the verification authentication value is calculated, there is no need to store it in the primary processing device, in particular in the primary data storage unit.

In one example embodiment, the method includes receiving a data section including information reflecting a version count for the externalised record and comparing the version count with a reference version count.

This enables the primary processing device to verify that the data retrieved is the data belongs to a version of the record that is expected. It is particularly useful if other primary processing devices may have had access to the externally stored piece of data.

According to another aspect of an example embodiment of the invention, there is provided a method of enabling the internalisation of a record in a system including a primary processing device, having a processor and a primary data storage unit, adapted to process active records in the processor and configured to store data belonging to an active record in the primary data storage unit; and a secondary data storage system, accessible to the primary processing device, and arranged to store a piece of data transferred by means of a method of external data storage according to an example embodiment of the invention as defined above, wherein data belonging to an active record is loaded into the primary data storage unit and the record is internalised by retrieving at least a piece of data belonging to the record from the secondary data storage system, wherein the step of internalising a record includes the receiving of at least one call initiated by an application program using data belonging to the record by an application programming interface arranged to retrieve the piece of data from the secondary data storage system.

This method is executed by the application programming interface to enable an embodiment of the method of internalising a record to be carried out. In particular, it moves some of the functionality needed to carry out the method to an application programming interface accessible to multiple application programs. Thus, this functionality need not be included in the application program. The application program still controls which record is internalised and when, thus avoiding much of the latency associated with unnecessarily often repeated internalisation and externalisation. This embodiment is particularly suited for use in a primary processing device with multitasking capabilities.

An example embodiment of the invention also provides a method of external data storage, method of internalising data, method of processing records in a multimedia system and system and computer program that allow the primary processing device to verify the integrity of the data belonging to a record.

This is achieved by providing a method of external data storage in a system including a primary processing device, having a processor and a primary data storage unit, adapted to process active records in the processor and configured to store data belonging to active records in the primary data storage unit; and a secondary data storage system, accessible to the primary processing device, which method includes loading data belonging to an active record into the primary data storage unit and externalising the record by transferring at least a piece of data belonging to the record to the secondary data storage system for storage, wherein the method includes storing information reflecting a version count for the externalised record and incrementing the version count prior to externalising the record.

Thus, if after externalisation, any part of the data belonging to the record, for example the externalised piece of data or any data remaining in the primary data storage unit, is modified, a comparison can be made with the version count stored, to determine whether the parts are still synchronised.

An example embodiment of the invention has the additional advantage that, because a count is maintained reflecting the number of times the record has been externalised, a measure is obtained of the use of the record by the primary device, allowing a limit to be set to this use. A further effect is that it is possible to keep track of which record is externalised most often, so that this record can be maintained in the primary memory unit, and another record externalised instead.

In one example embodiment, the method includes storing a reference data object in a data storage unit of the primary processing device for each externalised record, including a unique identifier and a copy of the information reflecting the version count.

Thus, the primary processing device has access to a copy of the information which cannot be changed by any other processing device to which the secondary storage system is also accessible.

An embodiment further includes transferring at least one data section including data corresponding to at least an associated part of the piece of data and data corresponding to the information reflecting the version count to the secondary data storage system.

Thus, a version count valid for the part of the piece of data in a section is stored in the secondary storage system with each section. This embodiment has the advantage that it allows the piece of data to be split into parts that are stored externally in such a way that it can be verified that these parts belong to the same version of the total collection of data belonging to the record. In particular, the data sections can be stored on different storage units within the secondary data storage system and assembled again into one valid collection of data belonging to the record.

An embodiment includes determining whether any data belonging to an active record has been changed after loading into the primary data storage unit and incrementing the version count only after determining that some data belonging to the active record has been changed.

This limits the range within which the version count value can lie. It is particularly advantageous when a copy of the information reflecting the version count is stored in the primary storage unit, since less memory need be reserved for storing this copy.

According to another aspect of the invention, there is provided a method of internalising a record in a system including a primary processing device, having a processor and a primary data storage unit, adapted to process active records in the processor and configured to store data belonging to an active record in the primary data storage unit; and a secondary data storage system, accessible to the primary processing device, and arranged to store a piece of data transferred by means of a method according to any one of the last-recited methods of external data storage according to an example embodiment of the invention, wherein at least one data section including data corresponding to at least an associated part of the piece of data is retrieved from the secondary data storage system, wherein a data section including information reflecting a version count for the externalised record is received and the version count is compared with a reference version count.

The method has the advantage of enabling a check of the data retrieved from the secondary storage system. It is particularly useful in environments which allow records to be externalised and internalised by different primary processing devices. If the record has been externalised by a first primary processing device and subsequently internalised and externalised by a second primary processing device, the first primary processing device can determine with minimal processing effort that the version of the record it last processed is no longer available for internalisation. Thus, it knows that it will need to be provided with information on the latest version now in the secondary storage system.

One embodiment of the method includes receiving the reference version count from a trusted third party system.

This enables a 'swap' in primary processing devices. A first primary processing device may externalise the record. The second primary processing device then executes this embodiment of the method, in order to be able to internalise the record and continue processing it. It is especially useful in environments where security is of concern. The trusted third party controls access to externalised records. Namely, if the second primary processing device externalises the record again, the version count is incremented again. The first primary processing device can then only internalise the record if it receives an updated version count from the trusted third party system.

An advantage is obtained through the application of any one of the above-mentioned methods in a method of processing records in a multimedia system, adapted to provide access to at least one consecutive piece of digital content forming an event and including a conditional access sub-system arranged to control access to the event in accordance with information contained in at least one record, wherein the multimedia system includes a secure primary processing device, having a processor and a primary data storage unit, adapted to run at least one application program for processing active records in the processor when an event is being accessed and configured to store data belonging to an active record in the primary data storage unit; and a secondary data storage system, accessible to the primary processing device.

In the context of the present disclosure, the term 'secure' means that the primary processing device is equipped with means to resist invasive and non-invasive attacks on the data stored and/or processed by it, which means may be hardware or software implemented or be implemented by a combination of both. Because the cost and effort involved in making the primary processing device tamper-resistant increases with its capacity, i.e. storage and/or processing capacity, it may be useful to limit the size, in particular the size of the primary data storage unit. An example embodiment of the invention allows this to be done whilst retaining the capacity to access a large number of different records, as part or all of the data belonging to records can be externally stored in the secondary storage system in an advantageous manner.

According to another aspect of the invention, there is provided a primary processing device, having a processor and a primary data storage unit, adapted to process active records in the processor, configured to store data belonging to an active record in the primary data storage unit, and adapted to execute any one of the above-discussed methods according to the invention.

According to yet another aspect of the invention there are provided computer program means which, when run by a primary processing device having a processor and a primary data storage unit, enable the primary processing device to execute any one of the above-discussed methods according to the invention.

BRIEF DESCRIPTION OF THE DRAWINGS

An example embodiment of the invention will now be described in further detail with reference to the accompanying drawings, of which

SPECIFIC DESCRIPTION

Figure 1:
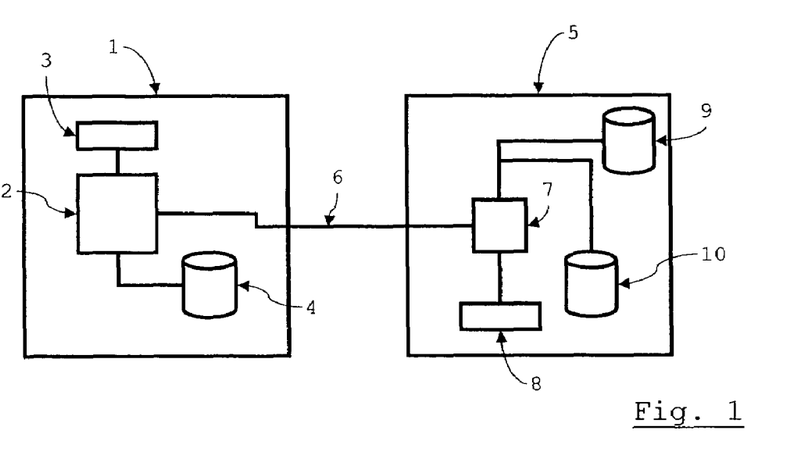
FIG. 1 is a very schematic overview of a type of system for which an example embodiment of the invention is intended.

To explain the general principles of the method of external data storage according to an example embodiment of the invention, FIG. 1 shows a simplified example of a system in which it may be applied. A more specific example will be illustrated further below with reference to FIGS. 7 and 8.

In FIG. 1 a first processing device 1 comprises a central processing unit (CPU) 2, main memory 3 and a primary mass storage device 4. The first processing device 1 may, for example, be implemented as a server (e.g. a database server), a personal computer, personal digital assistant, embedded processing device, mobile phone, etc. In short, any data processing device with a processor, data storage unit and means for accessing a secondary data storage unit is suitable for implementing an example embodiment of the invention. Depending on the implementation, main memory 3 may be integrated on a single chip with the CPU 2.

In the example to be described herein, the method is used to make the most of the limited capacity of the primary mass storage device 4, by temporarily transferring data from the primary mass storage device 4 to a secondary storage system. However, the method could equally well be applied to make better use of the capacity of the main memory 3 or of a cache memory (not shown) in the CPU 2. Thus, the term primary data storage unit as used herein can refer to both volatile and non-volatile data storage means, including optical, magnetic and solid state storage devices.

In FIG. 1, the first processing device 1 is connected to a secondary data storage system, formed by a second processing device 5. The connection is by means of a data link 6. The second processing device 5 also comprises a central processing unit (CPU) 7 with main memory 8 and first and second secondary mass storage devices 9 and 10, respectively. In basic embodiments of the invention, it is not a necessary requirement that the second processing device comprise the CPU 7, although some sort of microprocessor to direct data to the secondary mass storage devices will be present if the secondary storage system is implemented as an external device such as the second processing device 5. In its most simple embodiment, an embodiment of the invention could simply make the most of the limited capacity of primary mass storage device 5 by temporarily transferring data to a second mass storage device inside the first processing device 1.

In one embodiment, however, use is made of an external device, because the method is implemented in a system in which the primary processing device is more heavily secured against hacking attacks than the secondary processing device. In such systems, the method according to an example embodiment of the invention is particularly useful in that it provides a mechanism by means of which the capacity and/or size of the primary processing device can be kept small, thus making it easier and cheaper to protect.

The data link 6 can be a network link, for example an Ethernet, IEEE 1394 (FireWire) link, or it can be a data bus link, for example using a USB, SCSI, RS-232, Bluetooth or similar type link. Depending on the type of link used and the processing capacity needed to process messages belonging to the protocol, a simpler controller may be substituted for the CPU 7 of the second processing device.

The first processing device 1 is adapted to run one or more application programs, which are executed by CPU 2. At least one application program is configured to process records. For the present purpose, a record is understood to mean a collection of data items arranged for processing by the application program. The arrangement of the data is prescribed by the application program that processes it. An example embodiment of the invention encompasses both fixed-length and variable length records. According to an example embodiment of the invention, records that are to be processed by the application program executed on the CPU 2, are made active. Active records, i.e. all data belonging to records made active by application programs being run on the firs processing device 1 at any one instant, are stored in the primary mass storage device 4, at least for so long as the records are active. This does not preclude that (possible no longer current) copies of part or all of the data are stored elsewhere as well, for example on one of the secondary mass storage devices 9, 10.

The application programs according to an example embodiment of the invention are configured to decide autonomously whether to store part or all of the data externally, in other words on a different storage device than primary mass storage device 4. The rules according to which such decisions are made may vary. For example, part or all of the data may be backed up. However, an example embodiment of the invention may be used to externalise a record in order that a large part of the data belonging to the record may be removed from the primary mass storage device 4 to free up space. This part, or data enabling its recovery, in other words data corresponding to this part, is transferred to one of the secondary mass storage devices 9, 10 for storage and later retrieval by means of processes referred to herein as externalisation and internalisation, respectively.

Upon resolving that a record is to be externalised, the application program makes a call to an interface, arranged to transfer a piece of data belonging to the record to the second processing device 5. An interface is defined herein as the physical and logical arrangement supporting attachment to the secondary storage system. In one example embodiment, a further application program or operating system is installed on the first processing device 1, which supports an application program interface, to which the application program processing the record to be externalised may make a call. Thus, the developers of application programs for the first processing device 1 need not concern themselves exactly with the mechanism for externalising records. Nevertheless, embodiments in which part or all of the logic for externalising the record is comprised in the application program are not excluded from the scope of the present invention. In such embodiments, the interface referred to is largely the physical interface, that is to say, the mechanism to transfer data over the data link 6 to the second processing device 5.

It is noted that in the example embodiment of the present invention, the application program running on the first processing device 1 and processing the record makes the call to the interface to externalise the record. However, another application, using data belonging to the record, provided to it by the application processing the record on the first processing device may also make the call and further terminate processing of the record by the application program running on the first processing device 1. This other application may even be running on a separate processing device connected to the first processing device 1, including on the second processing device 5.

To allow subsequent internalisation of the record, a primary database (FIG. 2) is stored in a primary data storage unit of the primary processing device 1. This may be the primary mass storage device 4, but may be another data storage unit, e.g. main memory 3, or some other volatile or non-volatile memory unit. It is noted that the primary data storage unit in which the first processing device 1 stores the primary database may also be a peripheral device, but an internal device would allow faster access to the primary database. In any case, it is preferably comprised in a secure environment shared with the first processing device 1.

Figure 2:
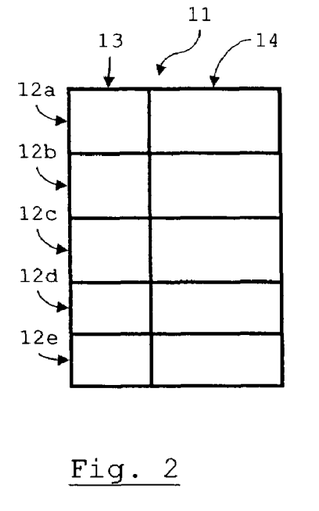
FIG. 2 is a schematic diagram of a database maintained by the primary processing device in a variant of the invention.

The composition of a primary database table 11 in the primary database is illustrated in FIG. 2. Note that the table is an example of an implementation of the invention. The exact data structure is not important, so long as there is at least a reference data object for each record that has been externalised. In this example, there is a primary database record 12*a*-12*e*, corresponding to a row in the primary database table 11, for each externalised record. Each primary database record 12 comprises a field in an index column 13, containing a unique key or index number used to access the primary database record 12. The value in the index column 13 is unique for each externalised record. In a version number column 14 of the primary database table 11, a version number is stored for each externalised record. The version number may be a simple counter, or it may any other type of information reflecting a version count for the associated externalised record. For example, where a record comprises a number of fields which can each have a finite number of values, the information in the version number column 14 may be information uniquely identifying one of the finite number of possible permutations of the values in the fields of the externalised record. Other types of information reflecting a version count are conceivable.

Figure 3:
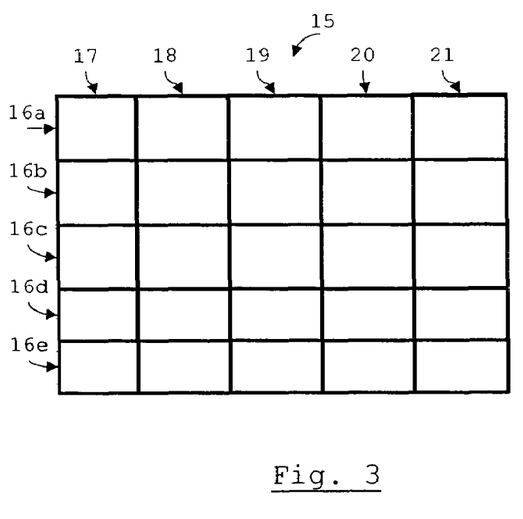
FIG. 3 is a schematic diagram of a database stored in the secondary storage system in the variant of FIG. 3.

In the present example, the second processing device 5 maintains an extension record table 15 (FIG. 3) in a database stored on each of the secondary mass storage devices 9, 10. Each of the shown rows corresponds to an extension record 16*a*-16*e*. Each extension record 16 is associated with an externalised record. Entries in an index column 17 comprise information reflecting an identifier unique to the associated externalised record. The extension record table 15 further comprises first, second and third data chunk columns 18-21. Thus, each extension record in the example secondary mass storage devices 9, 10 may comprise three data chunks. Each data chunk in an extension record 16 for an externalised record includes data corresponding to at least an associated part of a piece of data belonging to the externalised record. By corresponding, it is meant that the associated part of the piece of data can be fully recovered from the data in the externalised record. Thus, the data in the data chunk may be an encrypted, encoded or compressed version of the associated part of the piece of data belonging to the externalised record. In one example embodiment, an authentication string is stored with each data chunk. The extension record table further includes a version number column 21, in which information reflecting a version count for the externalised record is stored. What has been stated above in connection with the entries in the version number column 14 of primary database table 11 (FIG. 2) also holds true for the entries in the version number column 21 illustrated in FIG. 3. In an alternative implementation, each data chunk in one of the first, second and third data section columns 18-20 may comprise, or be stored with, separate information reflecting a version count valid for only that data chunk.

Figure 4:
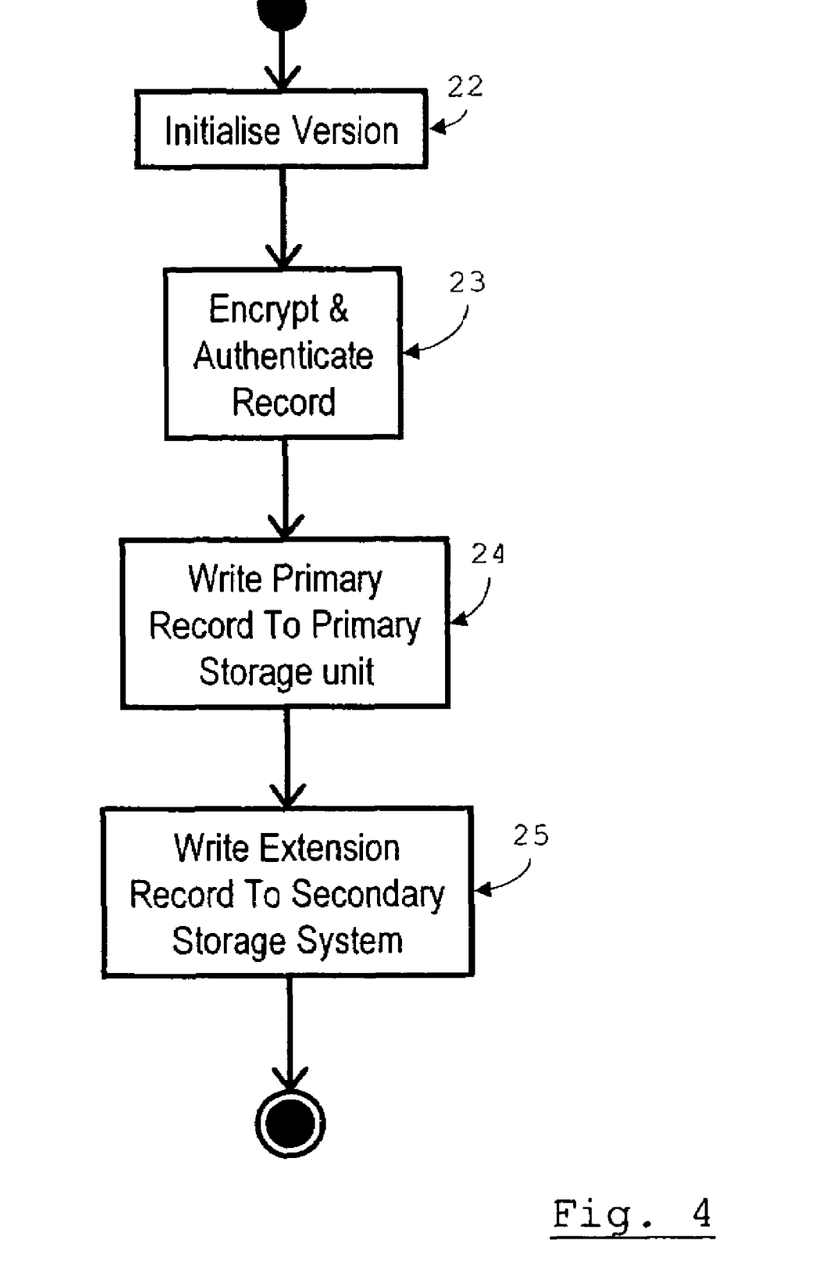
FIG. 4 is a flow diagram illustrating the creation of a record.

When a record is created by an application program being run on the first processing device 1 and using an example embodiment of the invention, the first processing device 1 goes through steps shown in FIG. 4. In a first step 22, a version counter is initialised. For example, when sequential numbers are used, the version counter is set to value zero, which can be regarded as incrementing from minus one to zero. The application program then makes the record active and proceeds to process it as normal. During processing the data belonging to the record, which is modified by the application program, is stored in the primary mass storage device 4. At some point, the application program may determine that the record will not be processed any further, or that another reason exists for externalising the record. It will thus initiate the externalisation of the record, by making a call to an interface. As mentioned, this may be an application program interface provided as part of the operating system of the first processing device 1 or by another application program.

It is assumed that at least the CPU 2, main memory 3 and primary mass storage device 4 are part of a secure environment, and that the data belonging to the record is to be protected. Thus, in a second step 23, the data belonging to the record is encrypted and at least one authentication string is calculated for the data. In a further step 24, a primary record is written to the primary database table 11 in the primary mass storage device 4. This entails entering information reflecting an identifier unique to the record being externalised in a corresponding entry in the index column 13. Furthermore, the version count is written to an entry in the version number column 14. Thus, a reference data object is stored in the primary mass storage device 4 for the externalised record, which reference data object includes a unique identifier and a copy of the information reflecting the version count.

Then, the encrypted piece of data belonging to the record is transferred to the second processing device 5, together with an authentication string and information reflecting the version count, in step 25. The second processing device 5 stores the contents of the transferred data section in the extension record table 15.

Figure 5:
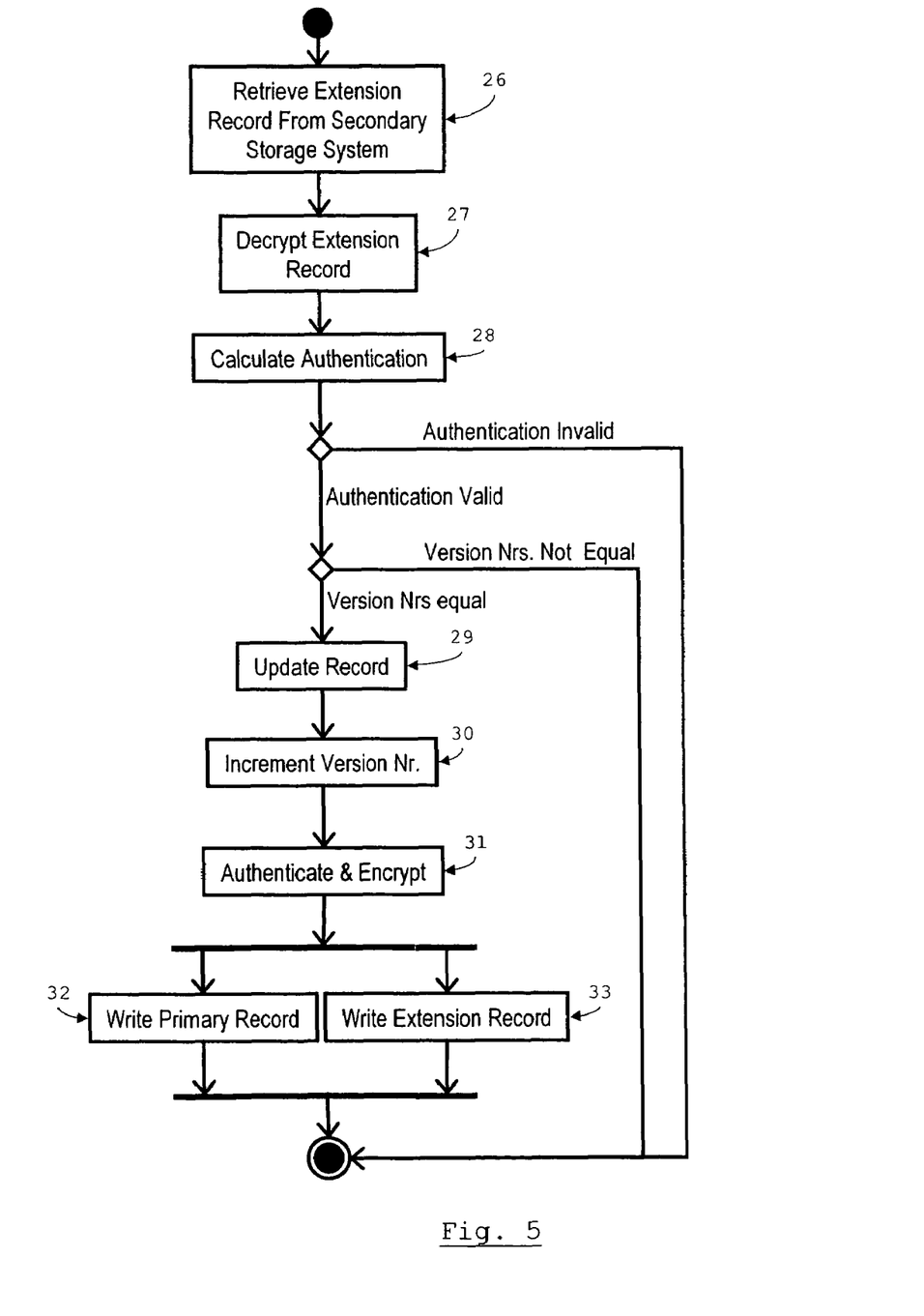
FIG. 5 is a flow diagram illustrating the modification of the record by the primary processing device.

According to an example embodiment of the invention, an application program using a record that has been externalised may also decide autonomously to internalise the record again. An embodiment of the internalisation process is illustrated in FIG. 5. Thus, at some point, the application program using, or at least configured to use, the data belonging to the record determines that the record is to be internalised. The application program makes a call to an interface to the secondary storage system. Software, for example an application program interface, that is part of the interface to the secondary storage system ensures that a message is sent to the second processing device 5, requesting data sections including data corresponding to data belonging to an externalised record. The message includes at least information reflecting the identifier unique to the externalised record. This information is retrieved from the associated entry in the index column 13 of the primary database table 11. The interface ensures that at least one data section including data corresponding to at least an associated part of the piece of data stored externally, is retrieved in step 26. The retrieved data section includes information reflecting a version count. This information is obtained from the associated entry in the version number column 21 of the extension record table 15. In step 27, the first processing device 1 decrypts the encrypted part of the piece of data in the data section retrieved, using a secret encryption key. It then calculates a verification authentication string from the decrypted data. The verification authentication string is compared in step 28 with an authentication string included in the retrieved data section. If the two match, a version count is derived from the information included in the retrieved data section, and compared with a version count derived from an entry in the version number column 14 of the primary database table 11. If the two match, the decrypted piece of data is used to assemble the now internalised record. The internalised record is stored in primary mass storage device 4 for use by the application program.

It will be assumed that the application program being run on the first processing device 1 actually modifies the data belonging to the record (step 29). After modification, it may again decide that the record is to be externalised. In that case, the version count is updated, in this case incremented, in step 30. A piece of data belonging to the record is encrypted and an authentication string is calculated for it in step 31. Then, the primary record in primary database table 11 is re-written. Information reflecting the incremented version count is written to the corresponding entry in the version number column 14. A data section, including the encrypted piece of data, the authentication string and a copy of the information reflecting the updated version count is transferred to the second processing device 5, where the corresponding extension record 16 in the extension record table 15 is updated, or re-written if it has been erased.

Figure 6:
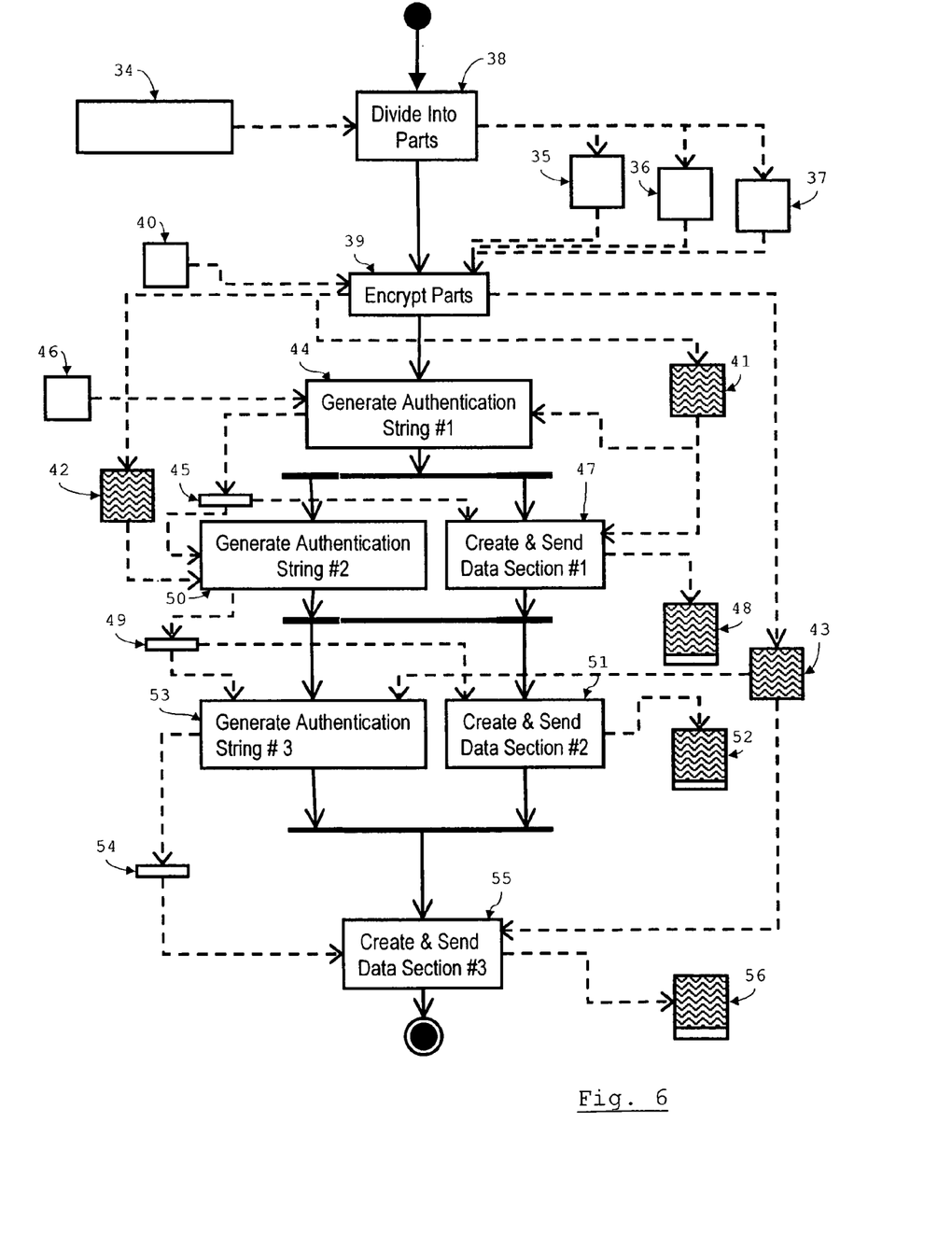
FIG. 6 is a flow diagram illustrating several steps in the externalisation of a record.

It is noted that an embodiment of the invention takes account of characteristics of the CPU 2 and/or main memory 3 and/or data link 6. This is illustrated in FIG. 6. Whilst a part of a piece of data 34 belonging to a record is processed for inclusion in a data section to be transferred or retrieved from a retrieved data section, it is held in main memory 3. The capacity of the CPU 2 or main memory 3 may thus set a bound to the size of the part, above which the in- and externalisation would unacceptably slow down the first processing device 1. Another limit to the size of the part of a piece of data is the size of the resulting data section, including the encrypted part, the authentication string and version count and index information. Taking into account the most limiting of the above-mentioned constraints, the first processing device 1 divides the piece of data 34 belonging to a record to be externalised into a number of parts 35-37 in a first step 38. In this case, there are first, second and third parts 35-37. The division into parts 35-37 may be carried out by the application program processing the record, or by executing a module belonging to an application program interface called by the application program. In a subsequent step 39, each of the parts 35-37 is separately encrypted using a secret encryption key 40, stored inside the secure environment of which the primary mass storage device 4 and the CPU 2 and main memory 3 are also part. A first data chunk 41 corresponds to a first part 35 of the piece of data 34 belonging to the record being externalised, a second data chunk 42 corresponds to a second part 36 and a third data chunk 43 corresponds to a third part 37.

In a next step 44 a first authentication string 45 is calculated for the first part 35 of the piece of data 34, using the first data chunk 41 as input, as well as a secret authentication key 46. The secret authentication key 46 is also stored inside the secure environment of which the primary mass storage device 4 and the CPU 2 and main memory 3 are also part. In a following step 47, a first data section 48 is created. The first data section 48 includes the first data chunk 41, the first authentication string 45, information corresponding to the index value stored in the entry in the index column 13 of the primary database table 11 for the externalised record, and information reflecting the fact that the first data section 48 is associated with the first part 35 in the sequence of parts 35-37 making up the piece of data 34. This first data section 48 is then transferred to the second processing device 5 for storage.

Concurrently, a second authentication string 49 is calculated in step 50. The second authentication string 49 is calculated from the second data chunk 42 and the first authentication string 45. This may, for example, be done by first concatenating the second data chunk 42 with the first authentication string 45 and then subjecting the result to the same authentication algorithm using the authentication key 46 as was used in step 44.

In step 51 a second data section 52 is created. Step 51 corresponds to step 50. Thus, the second data section 52 comprises the second data chunk 42, the second authentication string 49 and information reflecting an identifier unique to the externalised record, as well as information reflecting the fact that the second data section 52 is associated with the second part 36 in the sequence of parts 35-37 formed from the piece of data 34.

In step 53, a third authentication string 54 is calculated, using the second authentication string 49 as input, as well as the authentication key 46 and the third data chunk 43. Step 53 corresponds substantially to step 50.

In step 55 a third data section 56 is created and transferred to the second processing device 5. Similar to the first and second data sections 48, 52, the third data section 56 includes the third data chunk 43, the third authentication string 54 and information reflecting an identifier unique to the externalised record, as well as information reflecting the fact that the third data section 56 is associated with the third part 37 in the sequence of parts formed from the piece of data 34.

It is noted that the method of an example embodiment of the invention may be simultaneously applied to pieces of data belonging to other records than the one to which the piece of data 34 belongs. The data sections 48,52,56 associated with the parts 35-37 of the piece of data 34 belonging to one record do not, however, contain data chunks associated with parts of a piece of data belonging to another record. This ensures that the first, second and third data sections 48,52,56 remain of a size appropriate to the data link 6. It also ensures efficient processing by the second processing device 5. In particular, when the record is internalised again, exact copies of the first, second and third data sections 48,52,56 are retrieved. To prevent needless transfer of data, it is advantageous to separate data sections created for one record from those created for another.

Figure 7:
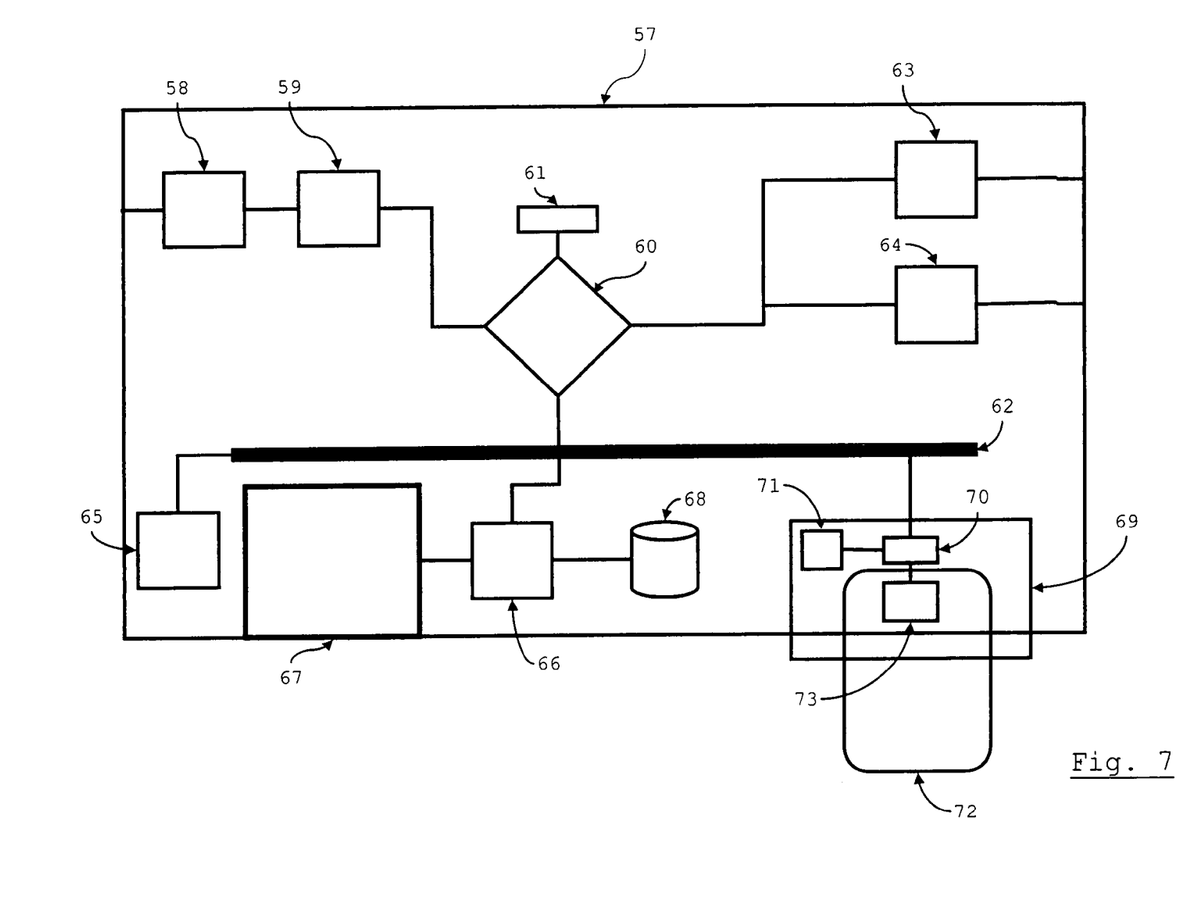
FIG. 7 shows an example of a multimedia system in which an example embodiment of the invention has been implemented.

FIG. 7 illustrates a specific example of a system in which records are processed, which is well suited to application of an example embodiment of the invention. The illustrated system is a multimedia system adapted to provide access to at least one consecutive piece of digital content and comprising a conditional access sub-system for controlling access to the digital content. Specifically, FIG. 7 shows a personal video recorder 57 for recording and playing back content data downloaded from or received in a broadcast from, a distributor of such content.

The personal video recorder comprises a tuner 58 for tuning to a specific carrier frequency. It further comprises a demodulator 59 for retrieving a transport stream including one or more elementary streams carrying digital content. These could, for instance be MPEG-2 elementary streams or streams of MPEG-4 access units. The elementary streams are processed by a multimedia processor 60, which has access to main memory 61 for this purpose. The multimedia processor 60 is connected to a system bus 62, for example an $I^2C$ bus. The multimedia processor 60 is further connected to a video encoder 63 and an audio Digital-to-Analogue Converter (DAC) 64. Thus, the personal video recorder is capable of making analogue video and audio signals available to a replay device, such as a television through appropriate outputs. Of course, in an alternative embodiment, the personal video recorder could also comprise an encoder for making an output available in the shape of an (unprotected) MPEG-2 encoded stream carried, for example over an Ethernet or IEEE 1394 home network to one or more home network end devices.

An interface controller 65 is also connected to the system bus 62. The interface controller 65 relays commands from a user to the multimedia processor 60 controlling operation of the personal video recorder 57, and may optionally provide feedback information to the user. For example, the interface controller could control an infra-red port for accepting commands from a remote control unit (not shown) or it could control a front panel interface of the personal video recorder 57.

The personal video recorder 57 further comprises a disk controller 66, connected to the system bus 62, and to an optical disk drive 67 and hard disk drive 68. The optical disk drive 67 and hard disk drive 68 are to be considered merely as representative of mass storage units comprised in a secondary data storage system for use in the method according to an example embodiment of the invention.

The conditional access sub-system comprises a conditional access module (CAM) 70, including a processor 71 for directing communications to and from the conditional access module 70. The CAM 73 additionally comprises a cryptographic co-processor 72, a dedicated digital signal processor for carrying out encryption and/or decryption operations. Examples of such CAMs 70 are known from Digital Video Broadcast (DVB) implementations, in which the CAM 70 communicates with an integrated receiver decoder, of which the personal video recorder 57 is a particular example, through a common interface (CI). In these known implementations, the conditional access module 70 comes in the shape of a PCMCIA card.

The conditional access sub-system further comprises a smart card 72, carrying a smart card Integrated Circuit (IC) 73. The smart card 72 conforms to the ISO 7816-2 standard. The smart card 72 interfaces to the CAM 70 and through it to the personal video recorder 57, by means of a physical interconnection system, comprising contact pads (not shown) on the smart card and contact pins (not shown) in the CAM 70, and one or more software modules implementing a communication protocol.

Figure 8:
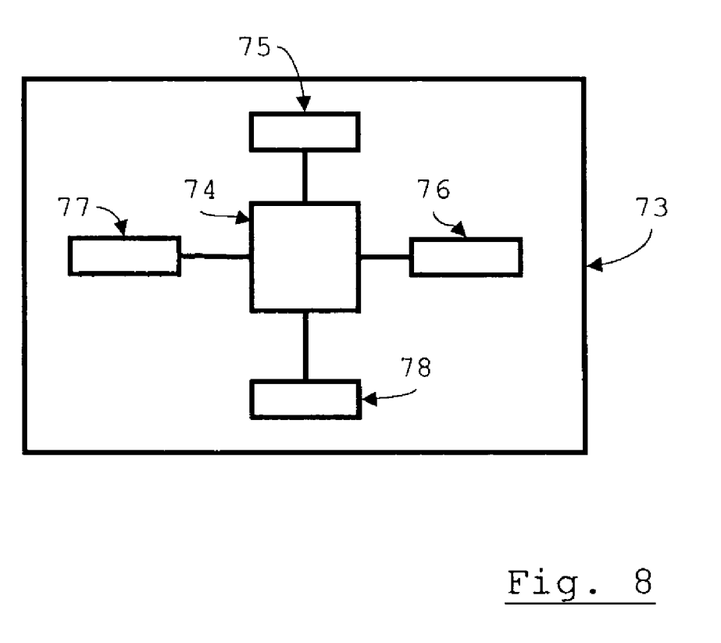
FIG. 8 shows an example of the basic architecture of the primary processing device shown FIG. 1.

FIG. 8 shows that the smart card IC 73 includes a central processing unit (CPU) 74. It further includes three types of memory module, namely a mask Read Only Memory (mask ROM) 75, Random Access Memory (RAM) 76 and Electronically Erasable Programmable Read Only Memory (EEPROM) 77. Of course, the smart card IC 73 also comprises an Input/Output (I/O) port 78 as part of the interface to the CAM 70. Alternative embodiments of the smart card IC 73 could comprise a Ferro-electric Random Access Memory instead of the EEPROM 77.

The mask ROM 75 is non-volatile memory. The operating system of the smart card 72 is stored in the mask ROM 75. Examples of suitable operating systems are MULTOS, Javacard and Windows card. Additionally, one or more secret keys may be stored in the mask ROM 75. The RAM 76 forms the memory working space. RAM 76 is volatile memory, and all data is lost when power to the smart card IC 72 is removed. The EEPROM 77 represents non-volatile storage memory for storing dynamic application data.

Of the three types of memory comprised in the smart card IC 73, the RAM 76 is generally the most expensive, followed by the EEPROM 77 and the mask ROM 75 in that order. It is consequently advantageous to keep the amount of memory, especially of the more expensive types, limited. By internalising and externalising records comprised in the dynamic application data stored in a primary data storage unit of the smart card 72, in this case the EEPROM 77, the smart card 72 can make do with a limited capacity EEPROM 77. By dividing pieces of data belonging to records that are internalised and externalised into parts, as part of the method according to an example embodiment of the invention, the smart card IC 73 can manage with a RAM 76 of limited size and an I/O port 78 of limited capacity.

A broadcast system in which the multimedia system illustrated in FIG. 7 is typically used, comprises a subscriber management system (SMS) where the details of all subscribers are kept. Information such as the channels and events that the subscriber is enabled for, his payment status, whether his smart card 72 is active or not and other information is kept on the SMS. An event is defined as a consecutive piece of digital content, e.g. a piece of a DVB MPEG-2 service, that is both subject to conditional access and has associated event information. An event is scrambled with one or more control words as keys to the scrambling algorithm. From the SMS, invoices for payment of subscriptions are sent out. The SMS controls the smart cards 72 distributed to subscribers by sending commands to them via a conditional access (CA) system. The CA system transforms these commands into the correct format for the smart card 72 and inserts the commands into a transport stream. Another function of the CA system is to encrypt control words with which an event is scrambled when it is broadcast to the subscribers. These encrypted control words are transmitted together with the content that forms the event as entitlement control messages (ECMs).

The content on offer and each event happening in the broadcast is scheduled by a scheduling system. The content is encoded/compressed by content servers. The formatted data from the content servers and CA system is multiplexed into a transport stream which is then modulated for the appropriate broadcast network (e.g. satellite, cable, terrestrial, internet, etc.).

The personal video recorder 57 uses the tuner 58 and demodulator 59 to recover the transport stream. The transport stream, which is scrambled, is routed to the conditional access module 70 by the multimedia processor 60. The conditional access sub-system de-scrambles the transport stream using a key hierarchy. Stored in the smart card 72, for example in the mask ROM 75 is a key unique to the smart card 72, known as the Xkey. In some alternative systems there can be a hierarchy of X-keys, of which the higher level ones are called group keys and are assigned to groups of subscribers. For simplicity, this description shall assume one level only.

The multimedia system comprises one or more software modules, of which at least some are installed on the smart card 72 (others may be installed on the personal video recorder 57 or CAM 70), which implement an Event Management System (EMS). The event management system comprises an application run on the smart card 72, which processes records containing information used to control access to events. These records include session records and event records. Whilst event records and session records are being processed, they are active, and stored in the EEPROM 77. Both event records and session records can be externalised by transferring at least a piece of data belonging to the record to a storage device in a secondary storage system, for example to the hard disk drive 68 in the personal video recorder 57.

In an exemplary embodiment, event records include the following fields: an active flag, a changed flag, a version number, a record identification, a playback count and a count of the number of copies. The active flag is set each time the event record is active. An event record is active at least when the event is being recorded, copied or played back. When an event record is active, it is processed by the CPU 74 of the smart card and data belonging to the record is stored in the EEPROM 77. If, in the course of the processing of the event record, a change is made to any of the data belonging to the event record, the changed flag is set. The virtue of having a changed flag is that unnecessary externalisations can be prevented. In one embodiment, when a command is received to externalise the event record, a check is first made of the changed flag. If it is not set, externalisation is not necessary, since the copy stored in the personal video recorder 57 is still accurate. The version number is incremented prior to each externalisation of the event record. The record identification allows the event record to be identified in calls made to and by the application program interface on the smart card 72. The playback count and the count of the number of copies are both types of information reflecting a playback count, which is incremented each time the event record is made active in order to provide access to the associated event. This will occur whenever access is required to the event, for example to make a copy of the event, to de-scramble and decode it, to record it on an optical disk inserted into the optical disk drive 67 or on the hard disk drive 68, etc.

Session records include entitlement information and program keys (P-Keys). P-keys are needed to decrypt the encrypted control words contained in the ECMs that are received, and may be recorded as part of the scrambled transport stream, by the personal video recorder 57. The P-keys and entitlement information for an event are obtained by paying for the event, whereupon the broadcaster's CA system transmits one or more Entitlement Management Messages (EMMs), comprising the entitlement information and the P-keys, encrypted under the X-key of the smart card 72. The smart card 72 retrieves the P-keys and entitlement information from the EMMs and adds them to a session record. There is a session record for each recording session, in other words for each consecutive period of time during which content data is recorded on the hard disk drive 68 or on a disk in optical disk drive 67. Each session record is linked to one or more event records and thus associated with the events with which these event records are associated. Access to one of the events is provided in the course of a viewing session for which time the session record is active, e.g. the data belonging to the session record is present in the EEPROM 77. The event record is also active during playback of the event.

To enable externalisation and later internalisation of event and session records, the smart card 72 comprises an application program interface, arranged to receive and process messages from an application implementing the EMS, and thus using the event and session records. Assuming that an event has been recorded during a session and that the P-keys needed to access the event have been stored in an associated session record, the application controlling the recording, and thus using the event and session record, makes an externalisation call to the smart card API implementing the externalisation of records when the recording has finished and no immediate playback is required. The following description will focus on the externalisation of the event record, in the understanding that externalisation of the session record is carried out in a similar way.

In one embodiment, the API divides a piece of data belonging to the record, which may comprise all of the data belonging to the record or a sub-set thereof, into a sequence of consecutive parts. Each part is sized in accordance with the maximum processing capacity of the interface between the EEPROM 77 and the hard disk drive 68 of the personal video recorder 57. The maximum processing capacity may be determined by the size of the RAM 76, central processing unit 74, I/O port 78, processor 70, the PCMCIA interface between the CAM 69 and the personal video recorder 57, or the size of the system bus 62, depending on the particular implementation.

Subsequently, the API receives an externalisation message for each part, each externalisation message represents a request to transfer a data section including data corresponding to at least an associated part of the piece of data to be transferred. The API generates the data sections using the method outlined in connection with FIG. 6. That is to say, each part of the piece of data belonging to the event record is encrypted and an authentication value is calculated for it. For each part of the piece of data, a separate data section is created, comprising the calculated authentication value, the encrypted part of the piece of data, and the position of the part in the sequence of parts created by dividing up the piece of data into consecutive parts. In addition, the section comprises information reflecting the version number.

The API receives a separate externalisation message for each data section. The data sections created using the method illustrated in FIG. 6 are returned one by one, each in response to an associated externalisation message. These externalisation messages comprise information corresponding to the event record identification and information identifying the data section by means of the position of the associated part of the piece of data in the sequence of parts. Optionally, the API may return information representing how many parts are in the sequence in response to the first received call.

After the last data section has been transferred, the application sends a confirmation request. If correct externalisation is confirmed, the changed flag in the copy of the data belonging to the record kept in the EEPROM 77 is reset. Only then may the record be made inactive and may the piece of data belonging to the record that was transferred for external storage be deleted from the EEPROM 77. However, a reference data object is kept in the EEPROM 77 for each externalised record. The reference data object includes the record identification, and the version number.

When the event record is internalised again, for example to enable playback of the associated event, the smart card API receives a call from an application using data belonging to the event record. The API then retrieves the data sections stored on the hard disk drive 68. Again, the data sections are retrieved and processed separately. Where each data section includes data corresponding to a part of a piece of data belonging to the record with a well-defined position in a sequence, the data sections are retrieved in order. Thus, the data section including data corresponding to the first part in the sequence is retrieved first. This is necessary in order to be able to calculate a reference authentication value for each section without having to buffer all the data sections first. Only the reference authentication value for the first section can be calculated without using the reference authentication values calculated for one or more of the other data sections. Note that the use of calculated reference authentication values obviates the need for storing reference authentication values. Only an authentication key need be stored. The authentication key can be stored in the mask ROM 75, which is less expensive than the EEPROM 77. Alternatively, it can be stored in the EEPROM 77 to allow a change of authentication key during the lifetime of the smart card 72.

The data section is decrypted using the encryption key stored in the smart card 72 (it is assumed that a symmetric algorithm is used). Then, the version number included with the data section is compared with the calculated reference authentication value and the version number of the event record is compared with the version number stored in the reference data object stored in the EEPROM 77. If both are correct, the process is repeated for each of the subsequent data sections, and the piece of data belonging to the event record is re-assembled in the EEPROM 77. After that, the event record can be activated and data retrieved from it to allow the conditional access sub-system to control the playback, copying or other use of an event stored on the hard disk drive 68.

Because data belonging to the event record is stored externally in encrypted form, it is difficult for hackers to, for example, modify the playback count downwards to enable more viewings than are allowed according to the entitlement information in a session record. Even if the hacker has deduced the encryption key, then the authentication key would be needed to calculate a new authentication value for a data section containing information corresponding to the downwardly modified playback count. Because chaining is used, the authentication values for all the other data sections associated with the event record would also be needed. It is not possible to simply make a copy of an earlier data section, because its version number does not match the version number stored in the reference data object in the EEPROM 77 of the smart card 72, so such earlier data sections will not lead to a successful internalisation of the event record.

The inclusion of a version number in the reference data object remaining in the EEPROM 77 of the smart card 72 and in the data sections transferred to the hard disk drive 68 enables a process for replacing a first smart card by a second smart card to be implemented. A second smart card is provided with data corresponding to the data in the reference data object in the first smart card, for example from a trusted third party, such as the CA system broadcasting data to the personal video recorder 57. The second smart card can then internalise the record using the data provided. When it subsequently externalises the record again, the version number is incremented. Thus, the first smart card will no longer internalise the record, because it is storing a reference data object with the previous version number for the record. Of course, the second smart card should be provided with the encryption and authentication key, as well as the reference data object.

The invention is not limited to the embodiments described above, but may be varied upon within the scope of the attached claims. For instance, the system comprising the personal video recorder 57 and conditional access module 69 with inserted smart card 72 is representative of similar multimedia systems which are similarly well-suited to application of an example embodiment of the invention. This includes systems including a set-top box instead of the personal video recorder, a personal computer with associated peripheral hardware to receive digital content protected by a method of conditional access, or a personal video recorder arranged to receive an analogue signal.

The invention claimed is:

1. A method of enabling external data storage in a system including a primary processing device, having a processor and a primary data storage unit, adapted to process active records in the processor and configured to store data belonging to active records in the primary data storage unit; and a secondary data storage system, accessible to the primary processing device, wherein the method includes:
   storing data belonging to an active record in the primary data storage unit;
   externalising the record by transferring at least a piece of data belonging to the record to the secondary data storage system for storage, wherein the externalising of the record includes the receiving of at least one call initiated by an application program using data belonging to the record to an application programming interface arranged to send the piece of data to the secondary data-storage-system;
   dividing the piece of data into a plurality of parts, receiving a plurality of externalisation messages, each identifying a data section including data corresponding to an associated one of the plurality of parts and transferring at least the identified data section in response to each externalisation message; and
   calculating an authentication value for each part of the piece of data and including data reflecting the authentication value in the data section that includes data associated with that part, wherein the authentication value for at least one part is calculated using information derived from a further part as input.

2. A method according to claim 1, including receiving at least one externalisation message including information identifying a data section including data corresponding to at least an associated part of only one piece of data and transferring at least the identified data section in response to the externalisation message.

3. A method according to claim 2, wherein the data corresponding to an associated part is generated by at least partly encrypting the associated part of the piece of data.

4. A method according to claim 2, including dividing the piece of data into a sequence of consecutive parts, receiving a series of externalisation messages, each including information identifying the record and information identifying a data section by means of a position of the corresponding part in the sequence, and including data corresponding to information identifying a data section in the data section before transferring it to the secondary storage system.

5. A method according to claim 4, including returning information representing how many parts are in the sequence in response to a call from the application program.

6. A method according to claim 2, including calculating an authentication value for each part of the piece of data and including data reflecting the authentication value in the data section that includes data associated with that part.

7. A method according to claim 2, including storing a reference data object in a data storage unit of the primary device for each externalised record, including a unique identifier, wherein data reflecting the unique identifier is included in each data section that includes data corresponding to a part of the piece of data belonging to the record.

8. A method of external data storage in a system including a primary processing device, having a processor and a primary data storage unit, adapted to run application programs for processing active records in the processor and configured to store data belonging to active records in the primary data storage unit; and a secondary data storage system, accessible to the primary processing device, which method includes:
   loading data belonging to an active record into the primary data storage unit;
   externalising the record by transferring at least a piece of data belonging to the record to the secondary data storage system for storage, wherein the externalising of the record includes making a call by an application program using data belonging to the record to an interface, arranged to transfer the piece of data to the secondary data storage system;
   dividing the piece of data into a plurality of parts, receiving a plurality of externalisation messages, each identifying a data section including data corresponding to an associated one of the plurality of parts and transferring at least the identified data section in response to each externalisation message; and
   calculating an authentication value for each part of the piece of data and including data reflecting the authentication value in the data section that includes data associated with that part, wherein the authentication value for at least one part is calculated using information derived from a further part as input.

9. A method according to claim 8, including transferring a data section including data corresponding to at least an associated part of only one piece of data belonging to a record.

10. A method according to claim 9, wherein the data corresponding to an associated part is generated by at least partly encrypting the associated part of the piece of data.

11. A method according to claim 9, including calculating an authentication value for each part of the piece of data and including data reflecting the authentication value in the data section that includes data corresponding to that part.

12. A method according to claim 11, including calculating the authentication value for at least one part of the piece of data using information derived from a further part as input.

13. A method according to claim 9, including storing a reference data object in a data storage unit of the primary device for each externalised record, including a unique identifier, wherein data reflecting the unique identifier is included in each data section that includes data corresponding to a part of the piece of data belonging to the record.

14. A method according to claim 8, including storing information reflecting a version count for the externalised record and incrementing the version count prior to externalising the record.

15. A method of internalising a record in a system including a primary processing device, having a processor and a primary data storage unit, adapted to process active records in the processor and configured to store data belonging to active records in the primary data storage unit; and a secondary data storage system, accessible to the primary processing device, and arranged to store a piece of data transferred by means of a method according to claim 8, which method includes
loading data belonging to the record into the primary data storage unit, wherein the system includes an interface for retrieving the piece of data belonging to the record from the secondary data storage system,
configuring an application program to use data belonging to the record, determining that the record is to be internalized, and
making at least one call to the interface.

16. A method according to claim 15, including receiving at least one data section including data corresponding to at least an associated part of one piece of data from the secondary storage system.

17. A method according to claim 16, including retrieving an identifier unique to the record from a reference object stored in a data storage unit of the primary processing device, wherein the at least one data section is stored in the secondary data storage system with information reflecting the unique identifier and are received in response to an internalisation message including information reflecting the unique identifier.

18. A method according to claim 15, wherein the piece of data comprises a plurality of parts, including receiving a number of data sections, each including data corresponding to an associated one of the plurality of parts.

19. A method according to claim 17, wherein the piece of data comprises a reference object having a number of parts, the method further including
   receiving a number of data sections, each including data corresponding to an associated one of the plurality of parts,
   retrieving information reflecting the number of parts from the reference object and
   receiving each data section in response to one of a corresponding number of internalisation messages.

20. A method according to claim 16 or 18, including receiving at least one data section including an authentication value, retrieving a secret piece of information stored in the primary processing device, calculating a verification authentication value for each data section from at least part of the data corresponding to at least an associated part of the piece of data, using the secret piece of information, and comparing the verification authentication value and the authentication value for each data section.

21. A method according to claim 20, including receiving a sequence of data sections, each including an authentication value, wherein the verification authentication value for at least one data section is calculated using information derived from a further data section as input.

22. A method according to claim 16 or 18, including retrieving a secret key stored in the primary processing device and decrypting at least part of a received data section.

23. A method according to claim 16 or 18, including receiving a data section including information reflecting a version count for the externalised record and comparing the version count with a reference version count.

24. A method of enabling the internalisation of a record in a system including a primary processing device, having a processor and a primary data storage unit, adapted to process active records in the processor and configured to store data belonging to an active record in the primary data storage unit; and a secondary data storage system, accessible to the primary processing device, and arranged to store a piece of data transferred by means of a method according to claim 8, wherein the method further comprises:
   loading data belonging to an active record into the primary data storage unit and internalizing the record by retrieving at least a piece of data belonging to the record from the secondary data storage system, wherein the internalising of the record includes receiving at least one call initiated by an application program using data belonging to the record by an application programming interface arranged to retrieve the piece of data from the secondary data storage system.

25. A method according to claim 24, including receiving at least one internalisation message including information identifying a data section including data corresponding to at least an associated part of the piece of data and retrieving at least the identified data section in response to the internalisation message.

26. A method according to claim 24, wherein the piece of data comprises a plurality of parts, the method including
receiving a plurality of internalisation messages, each identifying a data section including data corresponding to an associated one of the plurality of parts and
retrieving at least the identified data section in response to each internalisation message.

27. A method according to claim 25 or 26, including decrypting at least part of each transferred data section, the part which is decrypted including at least part of the data corresponding to a part of the piece of data.

28. A method according to claim 25 or 26, wherein the piece of data comprises an ordered sequence of consecutive parts, the method including receiving a series of internalisation messages, each including information identifying the record and information identifying a data section by means of a position of the associated part in the sequence.

29. A method according to claim 25 or 26, including calculating a reference authentication value for each part of the piece of data and comparing the reference authentication value with data reflecting an authentication value included in the data section associated with that part.

30. A method according to claim 26, including calculating a reference authentication value for each part of the piece of data and comparing the reference authentication value with data reflecting an authentication value included in the data section associated with that part, wherein the reference authentication value for at least one part is calculated using information derived from a further part as input.

31. A method of external data storage in a system including a primary processing device, having a processor and a primary data storage unit, adapted to process active records in the processor and configured to store data belonging to active records in the primary data storage unit; and a secondary data storage system, accessible to the primary processing device, which method includes
loading data belonging to an active record into the primary data storage unit and
externalising the record by transferring at least a piece of data belonging to the record to the secondary data storage system for storage, wherein the method includes
storing information reflecting a version count for the externalised record and incrementing the version count prior to externalising the record;
dividing the piece of data into a plurality of parts, receiving a plurality of externalisation messages, each identifying a data section including data corresponding to an associated one of the plurality of parts and transferring at least the identified data section in response to each externalisation message; and
calculating an authentication value for each of the plurality of parts of the piece of data and including data reflecting the authentication value in the data section that includes data associated with that part, wherein the authentication value for at least one part is calculated using information derived from a further part as input.

32. A method according to claim 31, including storing a reference data object in a data storage unit of the primary processing device for each externalised record, including a unique identifier and a copy of the information reflecting the version count.

33. A method according to claim 31, including transferring at least one data section including data corresponding to at least an associated part of the piece of data and data corresponding to information reflecting the version count to the secondary data storage system.

34. A method according to claim 31, including determining whether any data belonging to an active record has been changed after loading into the primary data storage unit and incrementing the version count only after determining that some data belonging to the active record has been changed.

35. A method according to claim 31 or 32, including setting a flag in an active record if any data belonging to the record is modified after loading into the primary data storage unit, wherein the record is only externalised after determining that the flag has been set.

36. A method of internalising a record in a system including a primary processing device, having a processor and a primary data storage unit, adapted to process active records in the processor and configured to store data belonging to an active record in the primary data storage unit; and a secondary data storage system, accessible to the primary processing device, and arranged to store a piece of data transferred by means of a method according to claim 31, wherein the method further comprises:
retrieving at least one data section including data corresponding to at least an associated part of the piece of data from the secondary data storage system,
receiving a data section including information reflecting a version count for the externalised record, and
comparing the version count with a reference version count.

37. A method according to claim 36, wherein the piece of data includes a plurality of parts, and the plurality of parts of the piece of data are only retrieved from the corresponding data included in the at least one data section and loaded into the primary data storage unit if the version count corresponds to the reference version count.

38. A method according to claim 36 or 37, including retrieving the reference version count from a reference data object for the externalised record, stored in a data storage unit of the primary processing device.

39. A method according to claim 36, including receiving the reference version count from a trusted third party system.

40. A method according to claim 36, including receiving the reference version count from the secondary storage system.

41. A method of processing records in a multimedia system, adapted to provide access to at least one consecutive piece of digital content forming an event and including a conditional access sub-system arranged to control access to the event in accordance with information contained in at least one record, wherein the multimedia system includes a secure primary processing device, having a processor and a primary data storage unit, adapted to run at least one application program for processing active records in the processor when an event is being accessed and configured to store data belonging to an active record in the primary data storage unit; and a secondary data storage system, accessible to the primary processing device, characterised by applying a method according to any one of claims 1, 8, 15, 24, 31 or 36.

42. A method according to claim 41, including making at least one event record associated with an event active when the associated event is being accessed.

43. A method according to claim 42, wherein an event record includes information reflecting a playback count, which method includes incrementing a playback count when the event record is made active.

44. A method according to claim 41, wherein access to an event is provided during a session associated with the event and the method includes making a session record, associated with the session, active during the associated session.

45. A method according to claim 44, including, during a session, receiving encrypted data for providing access to the associated event, retrieving at least one key from the associated session record, decrypting the encrypted data and returning the decrypted data.

46. A method according to claim 44, including, during a session, receiving access data for providing access to an event and storing the access data in a session record associated with a session associated with the event.

47. A primary processing device, having a processor and a primary data storage unit, adapted to process active records in the processor, configured to store data belonging to an active record in the primary data storage unit, and adapted to execute a method according to any one of claims 1, 8, 15, 24, 31 or 36.

48. A computer readable storage medium having instructions thereon that, when run by a primary processing device having a processor and a primary data storage unit, cause the primary processing device to execute the method according to any one of claims 1, 8, 15, 24, 31 or 36.

49. A primary processing device, having a processor and a primary data storage unit, adapted to process active records in the processor, configured to store data belonging to an active record in the primary data storage unit, and adapted to execute a method according to claim 41.

50. A computer readable storage medium having instructions thereon that, when run by a primary processing device having a processor and a primary data storage unit, cause the primary processing device to execute the method according to claim 41.

* * * * *